June 24, 1947.    M. P. McCLAIN    2,422,841
FASTENING DEVICE
Filed Dec. 11, 1944
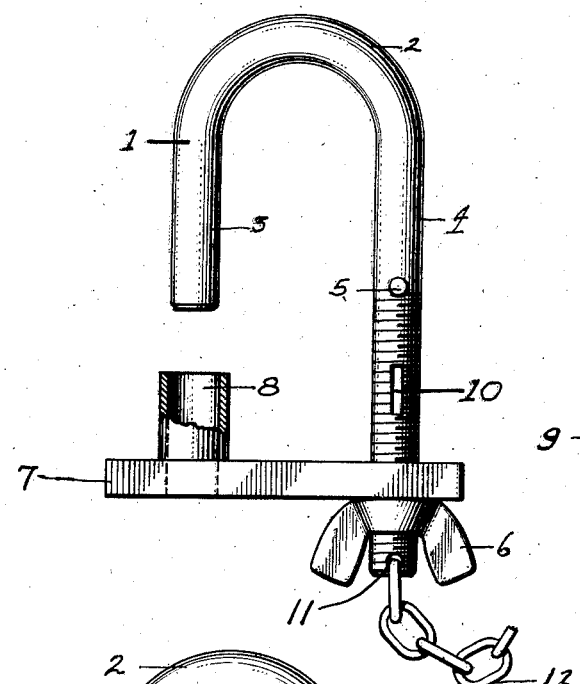
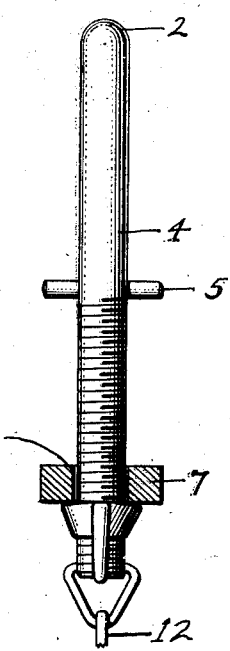
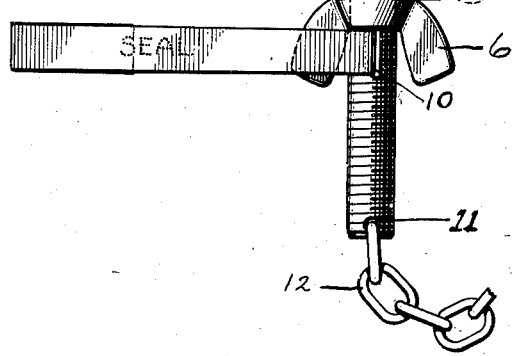
Inventor
MARVIN PAUL McCLAIN
Attorney Patented June 24, 1947

2,422,841

UNITED STATES PATENT OFFICE 2,422,841

FASTENING DEVICE

Marvin Paul McClain, Richmond, Va., assignor of one-half to James N. Johnson, Baltimore, Md.

Application December 11, 1944, Serial No. 567,619

1 Claim. (Cl. 292—328)

This invention relates to a fastening device and one of its objects is the provision of a fastener consisting of a shackle upon which is slidably mounted a bar adapted to be secured thereto.

Another object of this invention is the provision of a fastener adapted to accommodate a sealing device.

Other objects and features will more fully appear from the following description and accompanying drawing, in which Fig. 1 is a vertical sectional side view; Fig. 2 is a vertical sectional rear view, and Fig. 3 is a side view in perspective.

Referring to the drawings, a shackle 1 is provided with a shoulder 2 from which respectively depend arms 3 and 4; the former being the shorter in length. Arm 4 is threaded and has a pin 5 disposed therein to form a stop. A wing nut 6 is threadably mounted on arm 4.

A bar 7 is provided with an apertured-socket 8 near one of its ends and an orifice 9 near the other of its ends. Arms 3 and 4 of the shackle are for respective disposition in socket 8 and orifice 9 of the bar, as clearly illustrated in Fig. 3 of the drawings.

An aperture 10 is disposed in arm 4 and adapted to accommodate a seal or the like. A hole 11 is located near the tip of arm 4 and a chain 12 has one of its links therein.

The fastener functions as follows: the bar 7 is mounted in slidable fashion upon arm 4, and when arm 3 is disposed in socket 8 the fastener is in closed position. To maintain the fastener in closed position said bar is held firmly against pin 5 by wing nut 6; which latter may be limited in one directional movement by a seal or the like, as clearly illustrated in Fig. 3 of the drawings. To unfasten the device the seal (if used) is removed from aperture 10 and wing nut 6 threadably moved toward the tip of arm 4 until arm 3 is free from socket 8.

The fastener may be provided with a chain for securing it near the point to be fastened.

Having described this invention what is claimed is:

In a device of the character described consisting of a U-shackle provided with a short arm and a long threaded arm, the short arm extending to a point beyond the unthreaded portion of the long arm; a pin disposed in said long arm just above its threaded portion; a bar provided with a socket member extending therefrom and adapted to receive the end of said short arm prior to engagement of the pin against the bar; an orifice disposed in said bar for accommodating said long arm; a nut mounted in threadable fashion on said long arm and adapted to support said bar and secure said bar against said pin.

MARVIN PAUL McCLAIN.

REFERENCES CITED

The following references are of record in the file of this patent:

UNITED STATES PATENTS

| Number | Name | Date |
| --- | --- | --- |
| 77,953 | Bickerstaff | May 19, 1868 |
| 204,226 | Hunter | May 28, 1878 |
| 319,400 | Gaines | June 2, 1885 |
| 780,810 | Payne | Jan. 24, 1905 |
| 1,467,000 | Jauch | Sept. 4, 1923 |
| 1,867,689 | Van Leer | July 19, 1932 |
| 2,301,611 | Brociner | Nov. 10, 1942 |
| 431,051 | Greene | July 1, 1890 |